(12) United States Patent
Kim et al.

(10) Patent No.: US 9,934,902 B2
(45) Date of Patent: Apr. 3, 2018

(54) APPARATUS AND METHOD FOR TRANSCEIVING WIRELESS POWER

(71) Applicant: SAMSUNG ELECTRONICS CO., LTD., Suwon-si (KR)

(72) Inventors: Ki Young Kim, Yongin-si (KR); Nikolay Olyunin, Perm (RU); Alexander G. Chernokalov, Korolev (RU); Mikhail Makurin, Arkhangelsk (RU); Vladimir Y. Arkhipenkov, Mytischy (RU); Keum Su Song, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 637 days.

(21) Appl. No.: 14/094,048

(22) Filed: Dec. 2, 2013

(65) Prior Publication Data
US 2014/0152116 A1    Jun. 5, 2014

(30) Foreign Application Priority Data

Dec. 5, 2012   (RU) .............................. 2012152252
Nov. 8, 2013   (KR) ......................... 10-2013-0135866

(51) Int. Cl.
| | | |
|---|---|---|
| *H01F 27/42* | (2006.01) | |
| *H01F 37/00* | (2006.01) | |
| *H01F 38/00* | (2006.01) | |
| *H01F 38/14* | (2006.01) | |
| *H02J 50/12* | (2016.01) | |
| *H02J 5/00* | (2016.01) | |
| *H02J 7/02* | (2016.01) | |
| *H04B 5/00* | (2006.01) | |

(52) U.S. Cl.
CPC .............. *H01F 38/14* (2013.01); *H02J 5/005* (2013.01); *H02J 7/025* (2013.01); *H02J 50/12* (2016.02); *H04B 5/0037* (2013.01)

(58) Field of Classification Search
CPC .. H02J 5/005; H02J 7/025; H02J 17/00; H02J 50/10; H02J 7/0042; H02J 50/12; H02J 7/04; H02J 50/60; H02J 50/80; H02J 7/042; H02J 2007/0001; H02J 50/27; H02J 50/40
USPC ......................................................... 307/104
See application file for complete search history.

(56) References Cited

U.S. PATENT DOCUMENTS

| | | | | |
|---|---|---|---|---|
| 4,314,378 A | * | 2/1982 | Fowler ..................... | H01Q 7/08 455/291 |
| 5,029,268 A | * | 7/1991 | Pfandler ............... | B06B 1/0261 331/158 |
| 5,113,184 A | * | 5/1992 | Katayama ............ | G06K 7/0008 235/382.5 |
| 2008/0071487 A1 | * | 3/2008 | Zeng .................... | G01N 29/028 702/65 |

(Continued)

*Primary Examiner* — Jared Fureman
*Assistant Examiner* — Esayas Yeshaw
(74) *Attorney, Agent, or Firm* — NSIP Law

(57) ABSTRACT

An apparatus configured to transceive wireless power, includes a magnetostrictive resonator configured to be excited by a magnetic field, and a soft magnetic material disposed in a vicinity of the magnetostrictive resonator. The apparatus further includes a transducing coil disposed in a vicinity of the magnetostrictive resonator or the soft magnetic material, and configured to convert mechanical energy generated by the excitation of the magnetostrictive resonator to electric energy.

22 Claims, 9 Drawing Sheets

(56) References Cited

U.S. PATENT DOCUMENTS

| | | | |
|---|---|---|---|
| 2011/0232392 A1* | 9/2011 | Suess | G01L 1/10 73/779 |
| 2012/0098527 A1* | 4/2012 | Ely | G01D 5/208 324/207.15 |
| 2012/0280682 A1* | 11/2012 | Cheng | G01N 29/2412 324/301 |
| 2013/0062963 A1* | 3/2013 | Chernokalov | H02J 17/00 307/104 |
| 2013/0119778 A1* | 5/2013 | Jung | H01F 38/14 307/104 |
| 2013/0218048 A1* | 8/2013 | Hayden | G01R 33/18 600/577 |
| 2014/0097709 A1* | 4/2014 | Ueno | H02N 2/18 310/26 |

* cited by examiner

APPARATUS AND METHOD FOR TRANSCEIVING WIRELESS POWER

CROSS-REFERENCE TO RELATED APPLICATIONS

This application claims the benefit under 35 USC 119(a) of Russian Patent Application No. 2012152252, filed on Dec. 5, 2012, in the Russian Federal Service for Intellectual Property, and Korean Patent Application No. 10-2013-0135866, filed on Nov. 8, 2013, in the Korean Intellectual Property Office, the entire disclosures of which are incorporated herein by reference for all purposes.

BACKGROUND

1. Field

The following description relates to an apparatus and method for transceiving wireless power.

2. Description of Related Art

Research on wireless power transmission has been started to overcome an increase in inconveniences of wired power supplies, and the limited capacity of conventional batteries, due to a rapid increase in various electronic devices including electric vehicles, mobile devices, and the like. One of wireless power transmission technologies uses resonance characteristics of radio frequency (RF) devices. A wireless power transmission system using resonance characteristics may include a wireless power transmitting apparatus configured to supply power, and a wireless power receiving apparatus configured to receive the supplied power.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus configured to transceive wireless power, includes a magnetostrictive resonator configured to be excited by a magnetic field, and a soft magnetic material disposed in a vicinity of the magnetostrictive resonator. The apparatus further includes a transducing coil disposed in a vicinity of the magnetostrictive resonator or the soft magnetic material, and configured to convert mechanical energy generated by the excitation of the magnetostrictive resonator to electric energy.

The magnetostrictive resonator and the soft magnetic material may be in a form of a rod.

The magnetostrictive resonator and the soft magnetic material may be disposed with a distance less than a length of the magnetostrictive resonator therebetween.

The transducing coil and the magnetostrictive resonator may be disposed with a distance less than a length of the magnetostrictive resonator therebetween, and the transducing coil and the soft magnetic material may be disposed with a distance less than a length of the soft magnetic material therebetween.

The soft magnetic material may be a high-permeability ferrite rod.

The magnetostrictive resonator and the soft magnetic material may be aligned.

The magnetostrictive resonator may be in a form of a tubular rod, and may include a magnetostrictive ferrite material.

The magnetostrictive resonator may be configured to have circular remnant magnetization, and vibrate in a torsional vibration mode in response to the magnetostrictive resonator being excited by the magnetic field.

The magnetostrictive resonator and the soft magnetic material may be configured to have cylindrical dimensions.

The magnetostrictive resonator and the soft magnetic material may be disposed to be parallel to each other in a two-dimensional or three-dimensional array.

The magnetostrictive resonator may include magnetostrictive resonators configured to have equal resonant frequencies.

In another general aspect, an apparatus configured to transceive wireless power, includes magnetostrictive resonators configured to be excited by a magnetic field, and a transducing coil disposed in a vicinity of the magnetostrictive resonators, and configured to convert mechanical energy generated by the excitation of the magnetostrictive resonators to electric energy.

The magnetostrictive resonators may be in a form of a rod.

The transducing coil and the magnetostrictive resonators may be disposed with a distance less than a length of the magnetostrictive resonators therebetween.

The magnetostrictive resonators may be configured to have circular remanent magnetization, and vibrate in a torsional vibration mode in response to the magnetostrictive resonators being excited by the magnetic field.

The magnetostrictive resonators may be aligned with a distance less than a length of the magnetostrictive resonators therebetween.

The magnetostrictive resonators may be disposed to be parallel to each other with a distance less than a length of the magnetostrictive resonators therebetween.

The magnetostrictive resonators may be disposed to be parallel to each other in a two-dimensional or three-dimensional array.

The magnetostrictive resonators may be configured to have equal resonant frequencies.

In still another general aspect, a matching method of a wireless power transmitting apparatus including a magnetostrictive resonator and a transducing coil, includes measuring an amount of power transmitted by the wireless power transmitting apparatus to a wireless power receiving apparatus, and adjusting a number of turns of the transducing coil, and/or positions of the transducing coil and the magnetostrictive resonator, until the measured amount of power is maximized.

In yet another general aspect, a matching method of a wireless power receiving apparatus including a magnetostrictive resonator and a transducing coil, includes measuring an amount of power received by the wireless power receiving apparatus from a wireless power transmitting apparatus, and adjusting a number of turns of the transducing coil, and/or positions of the transducing coil and the magnetostrictive resonator, until the measured amount of power is maximized.

In still another general aspect, an apparatus includes a power transmitter including a magnetostrictive resonator and a transducing coil, and configured to wirelessly transmit power to another apparatus, and a matching unit configured to measure an amount of the transmitted power, and adjust a number of turns of the transducing coil, and/or positions of the transducing coil and the magnetostrictive resonator, until the measured amount of the transmitted power is a predetermined maximum value.

The apparatus may further include a power receiver including the magnetostrictive resonator and the transducing coil, and configured to wirelessly receive power from another apparatus, and a matching unit configured to measure an amount of the received power, and adjust the number of turns of the transducing coil, and/or the positions of the transducing coil and the magnetostrictive resonator, until the measured amount of the received power is a predetermined maximum value.

Other features and aspects will be apparent from the following detailed description, the drawings, and the claims.

Figure 1A:
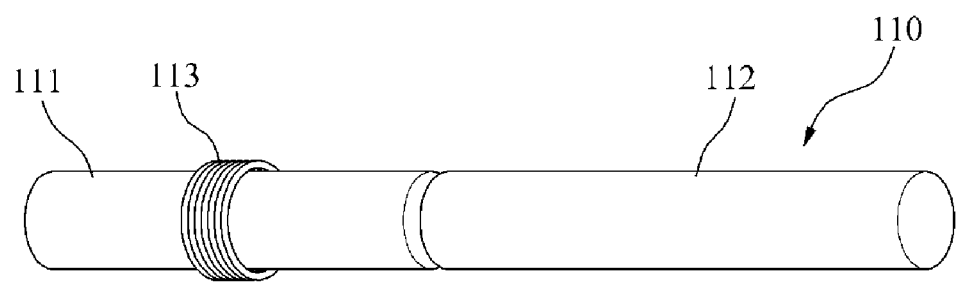
FIGS. 1A and 1B are diagrams illustrating examples of a wireless power transceiving apparatus.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1B:
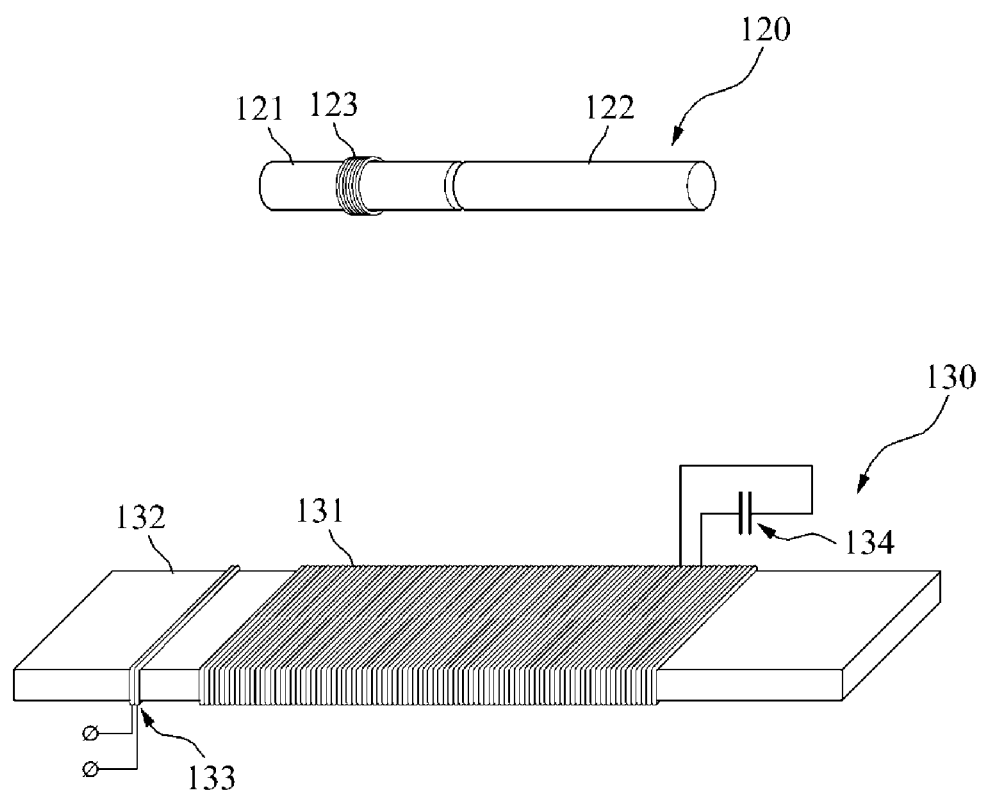

FIGS. 1A and 1B illustrate examples of a wireless power transceiving apparatus. The wireless power transceiving apparatus may include a power transmitter and a power receiver. In addition, the wireless power transceiving apparatus may be referred to as a wireless power transmitting apparatus and a wireless power receiving apparatus.

Referring to FIG. 1A, a wireless power transceiving apparatus 110 includes at least one magnetostrictive resonator 111, at least one soft magnetic material 112, and at least one transducing coil 113. The at least one magnetostrictive resonator 111 may include a solid-state magnetostrictive resonator. In an example, the at least one magnetostrictive resonator 111 and the at least one soft magnetic material 112 may be provided in a form of a rod, and have cylindrical dimensions. In this example, the at least one magnetostrictive resonator 111 may be provided in a form of tubular rod, and include a magnetostrictive ferrite material. The at least one soft magnetic material 112 may be a high-permeability ferrite rod. The at least one magnetostrictive resonator 111 may have equal resonant frequencies.

The at least one magnetostrictive resonator 111 is excited by a magnetic field. In an example, the at least one magnetostrictive resonator 111 may have circular remanent magnetization or biasing by an external permanent magnet. When the at least one magnetostrictive resonator 111 is excited, the at least one magnetostrictive resonator 111 vibrates. For example, when the at least one rod-shaped magnetostrictive resonator 111 is excited, the at least one magnetostrictive resonator 111 may vibrate in a torsional vibration mode.

The at least one transducing coil 113 converts mechanical energy generated by excitation of the at least one magnetostrictive resonator 111, to electric energy. The at least one transducing coil 113 may convert vibration generated by the excitement of the at least one magnetostrictive resonator 111, to electric energy. In an example, the at least one magnetostrictive resonator 111 may convert electric energy generated by the at least one magnetostrictive resonator 111, to mechanical energy.

The at least one transducing coil 113 is disposed in a vicinity of the at least one magnetostrictive resonator 111 or the at least one soft magnetic material 112. In this example, the at least one transducing coil 113 and the at least one magnetostrictive resonator 111 may be positioned with a distance less than a length of the at least one magnetostrictive resonator 111 therebetween, and the at least one transducing coil 113 and the at least one soft magnetic material 112 may be positioned with a distance less than a length of the at least one soft magnetic material 112 therebetween.

The at least one soft magnetic material 112 is disposed in a vicinity of the at least one magnetostrictive resonator 111. In this example, the at least one magnetostrictive resonator 111 and the at least one soft magnetic material 112 may be positioned with a distance less than the length of the at least one magnetostrictive resonator 111 therebetween, and be aligned in a line. In an example, the at least one magnetostrictive resonator 111 and the at least one soft magnetic material 112 may be disposed to be parallel to each other in a two-dimensional array or a three-dimensional array. The at least one soft magnetic material 112 plays a role of a magnetic field concentrator. When the at least one magnetostrictive resonator 111 and the as least one soft magnetic material 112 are positioned close to each other, the at least one soft magnetic material 112 concentrates a magnetic flux, and forms a magnetic circuit. Accordingly, an amplitude of the magnetic field in the at least one magnetostrictive resonator 111 may increase. Thus, coupling between a power transmitter of a first wireless power transceiving apparatus and a power receiver of a second wireless power transceiving apparatus, or coupling between a wireless power transmitting apparatus and a wireless power receiving apparatus, may increase, whereby an efficiency in wireless power transmission may increase.

Referring to FIG. 1B, a power receiver 120 of the first wireless power transceiving apparatus or the wireless power receiving apparatus includes at least one magnetostrictive resonator 121, at least one soft magnetic material 122, and at least one transducing coil 123. A power transmitter of the second wireless power transceiving apparatus or the wireless power transmitting apparatus includes an LC resonator 130. The LC resonator 130 includes coil windings 131, a ferrite core 132, matching windings 133, and a capacitor 134. The coil windings 131 form an inductance of the LC resonator 130. A resonant frequency of the capacitor 134 may be equal to a resonant frequency of the at least one magnetostrictive resonator 121. For example, dimensions of the ferrite core 132 may be 45×20×3 millimeters (mm). A distance between the power receiver 120 of the first wireless power transceiving apparatus and the power transmitter of the second wireless power transceiving apparatus, or a distance between the wireless power receiving apparatus and the wireless power transmitting apparatus, may be about 2 centimeters (cm). A length and a diameter of the at least one magnetostrictive resonator 121 may be 1 cm and 3.5 mm, respectively. The at least one transducing coil 123 is disposed in a vicinity of the at least one magnetostrictive resonator 121.

The LC resonator 130 is excited by a generator using the matching windings 133 wound around the ferrite core 132. When the LC resonator 130 is excited, the LC resonator 130 generates a magnetic field. The at least one soft magnetic material 122 operates as a magnetic field concentrator. The at least one magnetostrictive resonator 121 is excited by the magnetic field generated by the LC resonator 130. In an example, the at least one magnetostrictive resonator 121 may be excited by an alternating magnetic field generated by the LC resonator 130. When the at least one magnetostrictive resonator 121 is excited, the at least one magnetostrictive resonator 121 vibrates. For example, when the at least one rod-shaped magnetostrictive resonator 121 is excited, the at least one magnetostrictive resonator 121 may vibrate in a torsional vibration mode. The at least one transducing coil 123 converts vibration generated by excitement of the at least one magnetostrictive resonator 121, to electric energy.

When the at least one magnetostrictive resonator 121 and the as least one soft magnetic material 122 are positioned close to each other, an amplitude of the magnetic field exciting the at least one magnetostrictive resonator 121 may increase significantly. Thus, an amplitude of the magnetic field in the at least one magnetostrictive resonator 121 may increase, and the coupling between the power transmitter of the first wireless power transceiving apparatus and the power receiver of the second wireless power transceiving apparatus, or the coupling between the wireless power transmitting apparatus and the wireless power receiving apparatus, may increase, whereby an efficiency in wireless power transmission may increase.

Figure 2A:
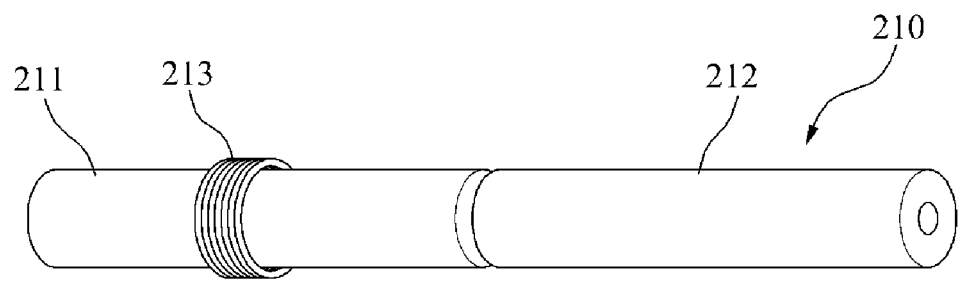
FIGS. 2A and 2B are diagrams illustrating other examples of a wireless power transceiving apparatus.
Figure 2B:
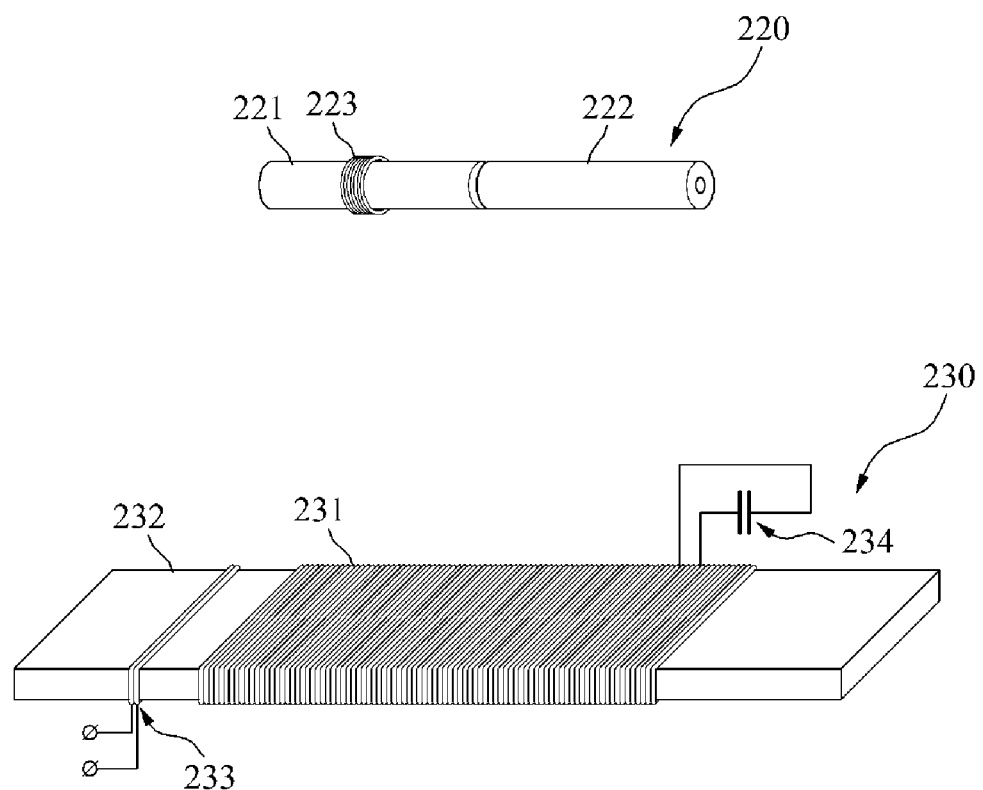

FIGS. 2A and 2B illustrate other examples of a wireless power transceiving apparatus. Referring to FIG. 2A, a wireless power transceiving apparatus 210 includes a first magnetostrictive resonator 211, a second magnetostrictive resonator 212, and at least one transducing coil 213.

The first magnetostrictive resonator 211 and the second magnetostrictive resonator 212 may correspond to solid-state magnetostrictive resonators. In an example, the first magnetostrictive resonator 211 and the second magnetostrictive resonator 212 may be provided in a form of a rod, and have cylindrical dimensions. In this example, the first magnetostrictive resonator 211 and the second magnetostrictive resonator 212 may be provided in a form of a tubular rod, and include a magnetostrictive ferrite material. The first magnetostrictive resonator 211 and the second magnetostrictive resonator 212 may have equal resonant frequencies. As a number of magnetostrictive resonators increases, a number of coupled magnetostrictive resonators may increase as well. Accordingly, an efficiency in wireless power transmission may increase.

The first magnetostrictive resonator 211 and the second magnetostrictive resonator 212 are excited by a magnetic field. In an example, the first magnetostrictive resonator 211 and the second magnetostrictive resonator 212 may have circular remanent magnetization or biasing by an external permanent magnet. When the first magnetostrictive resonator 211 and the second magnetostrictive resonator 212 are excited, the first magnetostrictive resonator 211 and the second magnetostrictive resonator 212 vibrate. For example, when the rod-shaped first magnetostrictive resonator 211 and the rod-shaped second magnetostrictive resonator 212 are excited, the first magnetostrictive resonator 211 and the second magnetostrictive resonator 212 may vibrate in a torsional vibration mode.

The at least one transducing coil 213 converts vibration generated by the excitement of the first magnetostrictive resonator 211 and the second magnetostrictive resonator 212, to electric energy. The at least one transducing coil 213 is disposed in a vicinity of the first magnetostrictive resonator 211 and the second magnetostrictive resonator 212. In this example, the at least one transducing coil 213, the first magnetostrictive resonator 211, and the second magnetostrictive resonator 212 may be positioned with a distance less than a length of the first magnetostrictive resonator 211 and the second magnetostrictive resonator 212 therebetween.

The first magnetostrictive resonator 211 and the second magnetostrictive resonator 212 may be positioned with a distance less than the length of the first magnetostrictive resonator 211 and the second magnetostrictive resonator 212 therebetween. In this example, the first magnetostrictive resonator 211 and the second magnetostrictive resonator 212 may be aligned in a line. For example, the first magnetostrictive resonator 211 and the second magnetostrictive resonator 212 may be aligned in a line with a distance less than 1 mm therebetween. When the first magnetostrictive resonator 211 and the second magnetostrictive resonator 212 are aligned in a line, an effect of demagnetization of the first magnetostrictive resonator 211 and the second magnetostrictive resonator 212 may be reduced. The reduction of the effect of the demagnetization may indicate that an amplitude of a magnetic field around the first magnetostrictive resonator 211 and the second magnetostrictive resonator 212 increases. Thus, coupling between a power transmitter of a first wireless power transceiving apparatus and a power receiver of a second wireless power transceiving apparatus, or coupling between a wireless power transmitting apparatus and a wireless power receiving apparatus, may increase, whereby an efficiency in wireless power transmission may increase.

Referring to FIG. 2B, a power receiver 220 of the first wireless power transceiving apparatus or the wireless power receiving apparatus includes a first magnetostrictive resonator 221, a second magnetostrictive resonator 222, and at least one transducing coil 223. A power transmitter of the second wireless power transceiving apparatus or the wireless power transmitting apparatus includes an LC resonator 230. The LC resonator 230 includes coil windings 231, a ferrite core 232, matching windings 233, and a capacitor 234. The coil windings 231 form an inductance of the LC resonator 230. A resonant frequency of the capacitor 234 may be equal to a resonant frequency of the first magnetostrictive resonator 221. For example, dimensions of the ferrite core 232 may be 45×20×3 mm. A distance between the power receiver 220 of the first wireless power transceiving apparatus and the power transmitter of the second wireless power transceiving apparatus, or a distance between the wireless power receiving apparatus and the wireless power transmitting apparatus, may be about 2 cm. A length and a diameter of the first magnetostrictive resonator 221 may be 1 cm and 3.5 mm, respectively. The at least one transducing coil 223 is disposed in a vicinity of the first magnetostrictive resonator 221.

The LC resonator 230 is excited by a generator using the matching windings 233 wound around the ferrite core 232. When the LC resonator 230 is excited, the LC resonator 230 generates a magnetic field. The first magnetostrictive resonator 221 and the second magnetostrictive resonator 222 are excited by the magnetic field generated by the LC resonator 230. For example, the first magnetostrictive resonator 221 and the second magnetostrictive resonator 222 may be excited by an alternating magnetic field generated by the LC resonator 230. When the first magnetostrictive resonator 221 and the second magnetostrictive resonator 222 are excited, the first magnetostrictive resonator 221 and the second magnetostrictive resonator 222 vibrate. For example, when the rod-shaped first magnetostrictive resonator 221 and the rod-shaped second magnetostrictive resonator 222 are excited, the first magnetostrictive resonator 221 and the second magnetostrictive resonator 222 may vibrate in a torsional vibration mode. The at least one transducing coil 223 converts vibration generated by excitement of the first magnetostrictive resonator 221 and the second magnetostrictive resonator 222, to electric energy. As a number of magnetostrictive resonators increases, a number of coupled magnetostrictive resonators may increase as well. Accordingly, an efficiency in wireless power transmission may increase.

When the first magnetostrictive resonator 221 and the second magnetostrictive resonator 222 are aligned in a line, an effect of demagnetization of the first magnetostrictive resonator 221 and the second magnetostrictive resonator 222 may be reduced, and an amplitude of a magnetic field around the first magnetostrictive resonator 221 and the second magnetostrictive resonator 222 increases. As the amplitude of the magnetic field increases, the excitation of the first magnetostrictive resonator 221 and the second magnetostrictive resonator 222 may be more activated. Thus, the coupling between the power transmitter of the first wireless power transceiving apparatus and the power receiver of the second wireless power transceiving apparatus, or the coupling between the wireless power transmitting apparatus and the wireless power receiving apparatus, may increase, whereby an efficiency in wireless power transmission may increase.

Figure 3A:
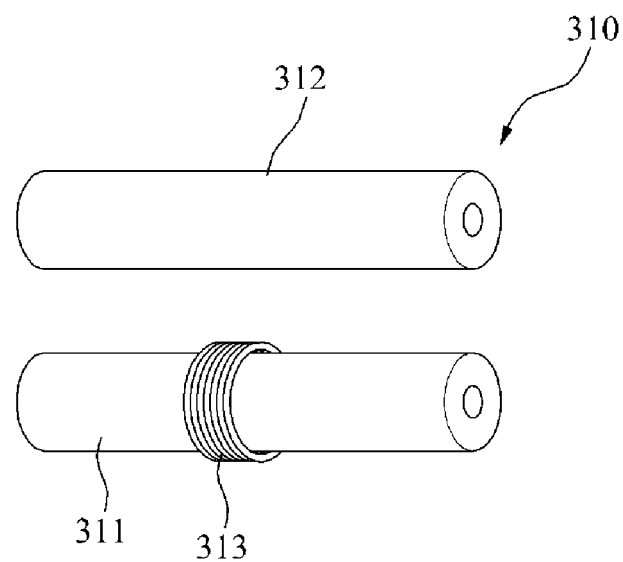
FIGS. 3A and 3B are diagrams illustrating still other examples of a wireless power transceiving apparatus.
Figure 3B:
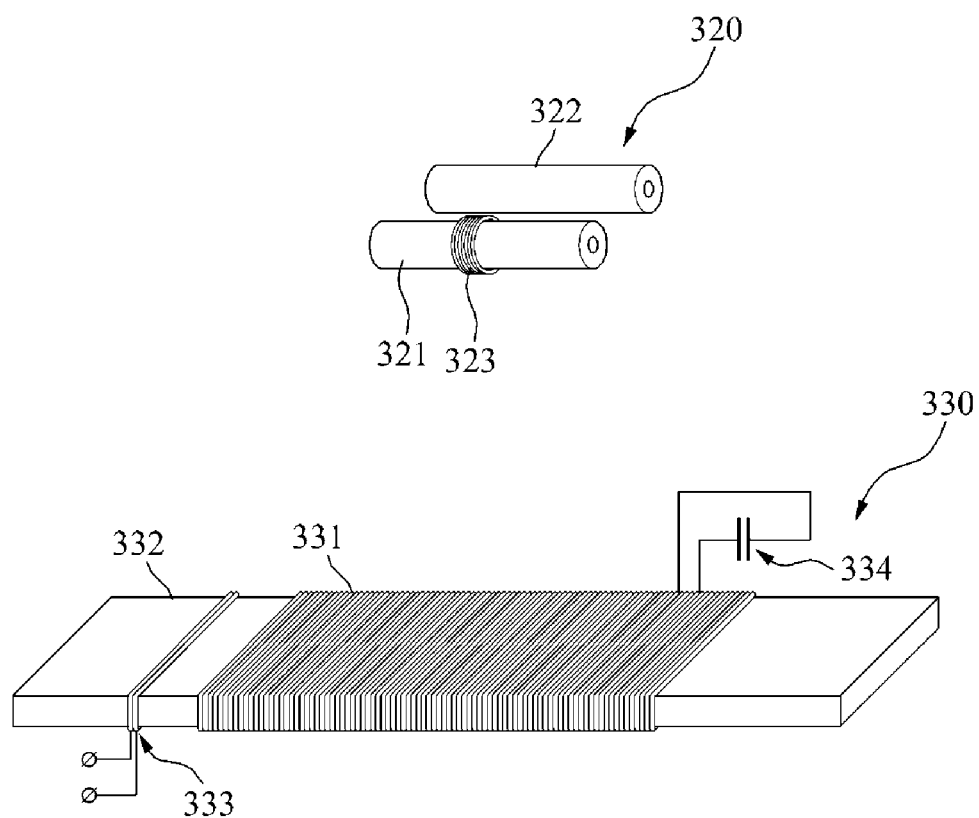

FIGS. 3A and 3B illustrate still other examples of a wireless power transceiving apparatus. Referring to FIG. 3A, a wireless power transceiving apparatus 310 includes a first magnetostrictive resonator 311, a second magnetostrictive resonator 312, and at least one transducing coil 313.

The first magnetostrictive resonator 311 and the second magnetostrictive resonator 312 may correspond to solid-state magnetostrictive resonators. In an example, the first magnetostrictive resonator 311 and the second magnetostrictive resonator 312 may be provided in a form of rods, and have cylindrical dimensions. In this example, the first magnetostrictive resonator 311 and the second magnetostrictive resonator 312 may be provided in a form of tubular rods, and include a magnetostrictive ferrite material. The first magnetostrictive resonator 311 and the second magnetostrictive resonator 312 may have equal resonant frequencies.

The first magnetostrictive resonator 311 and the second magnetostrictive resonator 312 are excited by a magnetic field. In an example, the first magnetostrictive resonator 311 and the second magnetostrictive resonator 312 may have circular remanent magnetization or biasing by an external permanent magnet. When the first magnetostrictive resonator 311 and the second magnetostrictive resonator 312 are excited, the first magnetostrictive resonator 311 and the second magnetostrictive resonator 312 vibrate. For example, when the rod-shaped first magnetostrictive resonator 311 and the rod-shaped second magnetostrictive resonator 312 are excited, the first magnetostrictive resonator 311 and the second magnetostrictive resonator 312 may vibrate in a torsional vibration mode.

The at least one transducing coil 313 converts vibration generated by the excitement of the first magnetostrictive resonator 311 and the second magnetostrictive resonator 312, to electric energy. The at least one transducing coil 313 is disposed in a vicinity of the first magnetostrictive resonator 311 and the second magnetostrictive resonator 312. In this example, the at least one transducing coil 313, the first magnetostrictive resonator 311, and the second magnetostrictive resonator 312 may be positioned with a distance less than a length of the first magnetostrictive resonator 311 and the second magnetostrictive resonator 312 therebetween.

The first magnetostrictive resonator 311 and the second magnetostrictive resonator 312 may be positioned with a distance less than the length of the first magnetostrictive resonator 311 and the second magnetostrictive resonator 312 therebetween. In this example, the first magnetostrictive resonator 311 and the second magnetostrictive resonator 312 may be disposed to be parallel to each other in a two-dimensional array or a three-dimensional array. In an example, the first magnetostrictive resonator 311 and the second magnetostrictive resonator 312 may be disposed to be parallel to each other in the two-dimensional array or the three-dimensional array within a distance therebetween at which coupling between the first magnetostrictive resonator 311 and the second magnetostrictive resonator 312 are relatively strong, so that energy exchange between the first magnetostrictive resonator 311 and the second magnetostrictive resonator 312 is performed faster than energy dissipation between the first magnetostrictive resonator 311 and the second magnetostrictive resonator 312. When strong coupling occurs between the first magnetostrictive resonator 311 and the second magnetostrictive resonator 312, an efficiency in wireless power transmission may increase.

Referring to FIG. 3B, a power receiver 320 of a first wireless power transceiving apparatus or a wireless power receiving apparatus includes a first magnetostrictive resonator 321, a second magnetostrictive resonator 322, and at least one transducing coil 323. A power transmitter of a second wireless power transceiving apparatus or a wireless power transmitting apparatus includes an LC resonator 330. The LC resonator 330 includes coil windings 331, a ferrite core 332, matching windings 333, and a capacitor 334. The coil windings 331 form an inductance of the LC resonator 330. A resonant frequency of the capacitor 334 may be equal to a resonant frequency of the first magnetostrictive resonator 321. For example, dimensions of the ferrite core 332 may be 45×20×3 mm. A distance between the power receiver 320 of the first wireless power transceiving apparatus and the power transmitter of the second wireless power transceiving apparatus, or a distance between the wireless power receiving apparatus and the wireless power transmitting apparatus, may be about 2 cm. A length and a diameter of the first magnetostrictive resonator 321 may be 1 cm and 3.5 mm, respectively. The at least one transducing coil 323 is disposed in a vicinity of the first magnetostrictive resonator 321.

The LC resonator 330 is excited by a generator using the matching windings 333 wound around the ferrite core 332.

When the LC resonator 330 is excited, the LC resonator 330 generates a magnetic field. The first magnetostrictive resonator 321 and the second magnetostrictive resonator 322 are excited by the magnetic field generated by the LC resonator 330. In an example, the first magnetostrictive resonator 321 and the second magnetostrictive resonator 322 may be excited by an alternating magnetic field generated by the LC resonator 330. When the first magnetostrictive resonator 321 and the second magnetostrictive resonator 322 are excited, the first magnetostrictive resonator 321 and the second magnetostrictive resonator 322 vibrate. For example, when the rod-shaped first magnetostrictive resonator 321 and the rod-shaped second magnetostrictive resonator 322 are excited, the first magnetostrictive resonator 321 and the second magnetostrictive resonator 322 may vibrate in a torsional vibration mode. The at least one transducing coil 323 converts vibration generated by excitement of the first magnetostrictive resonator 321 and the second magnetostrictive resonator 322, to electric energy. As a number of magnetostrictive resonators increases, a number of coupled magnetostrictive resonators may increase as well. Accordingly, an efficiency in wireless power transmission may increase.

In an example, the first magnetostrictive resonator 321 and the second magnetostrictive resonator 322 may be disposed to be parallel to each other in a two-dimensional array or a three-dimensional array within a distance therebetween at which coupling between the first magnetostrictive resonator 321 and the second magnetostrictive resonator 322 are relatively strong, so that energy exchange between the first magnetostrictive resonator 321 and the second magnetostrictive resonator 322 is performed faster than energy dissipation between the first magnetostrictive resonator 321 and the second magnetostrictive resonator 322. When strong coupling occurs between the first magnetostrictive resonator 321 and the second magnetostrictive resonator 322, the first magnetostrictive resonator 321 and the second magnetostrictive resonator 322 may operate as a single resonator. Thus, an amplitude of a magnetic field around the first magnetostrictive resonator 321 and the second magnetostrictive resonator 322 increases. Thus, coupling between a power transmitter of the first wireless power transceiving apparatus and a power receiver of the second wireless power transceiving apparatus, or coupling between the wireless power transmitting apparatus and the wireless power receiving apparatus, may increase, whereby an efficiency in wireless power transmission may increase.

Figure 4:
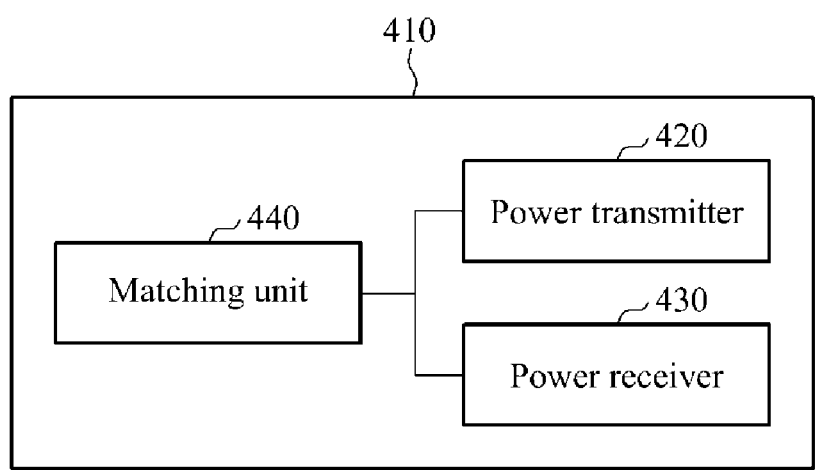
FIG. 4 is a block diagram illustrating an example of a wireless power transceiving apparatus.

FIG. 4 illustrates an example of a wireless power transceiving apparatus 410. Referring to FIG. 4, the wireless power transceiving apparatus 410, hereinafter referred to as a first wireless power transceiving apparatus, includes a power transmitter 420, a power receiver 430, and a matching unit 440. The first wireless power transceiving apparatus 410 may transmit and receive wireless power to and from a second wireless power transceiving apparatus (not shown). The power transmitter 420 and the power receiver 430 may include at least one magnetostrictive resonator, at least one soft magnetic material disposed in a vicinity of the at least one magnetostrictive resonator, and at least one transducing coil disposed in a vicinity of the at least one magnetostrictive resonator or the at least one soft magnetic material.

In the power transmitter 420 and the power receiver 430, the at least one magnetostrictive resonator and the at least one soft magnetic material may be provided in a form of a rod, and have cylindrical dimensions. In this example, the at least one magnetostrictive resonator may be provided in a form of tubular rod, and include a magnetostrictive ferrite material. The at least one soft magnetic material may be a high-permeability ferrite rod. The at least one magnetostrictive resonator may have equal resonant frequencies.

The at least one magnetostrictive resonator and the at least one soft magnetic material may be positioned with a distance less than a length of the at least one magnetostrictive resonator therebetween, and be aligned in a line. In addition, the at least one magnetostrictive resonator and the at least one soft magnetic material may be disposed to be parallel to each other in a two-dimensional array or a three-dimensional array. The at least one transducing coil and the at least one magnetostrictive resonator may be positioned with a distance less than the length of the at least one magnetostrictive resonator therebetween, and the at least one transducing coil and the at least one soft magnetic material may be positioned with a distance less than a length of the at least one soft magnetic material therebetween.

When the first wireless power transceiving apparatus 410 transmits power to the second wireless power transceiving apparatus, the at least one magnetostrictive resonator may be excited by an alternating magnetic field generated by current present in the at least one transducing coil. The at least one magnetostrictive resonator may have circular remanent magnetization. When the at least one magnetostrictive resonator is excited, the at least one magnetostrictive resonator may vibrate in a torsional vibration mode.

When the at least one magnetostrictive resonator and the at least one soft magnetic material are disposed close to each other within a distance less than the length of the at least one magnetostrictive resonator therebetween, the at least one soft magnetic material may concentrate a magnetic flux. When the magnetic flux is concentrated, excitation of the at least one magnetostrictive resonator may be more activated. Thus, the at least one magnetostrictive resonator may generate more vibration. The at least one transducing coil may convert the vibration generated by the excitation of the at least one magnetostrictive resonator, to electric energy. The at least one magnetostrictive resonator may transmit the electric energy converted by the at least one transducing coil through resonance with a resonator included in the second wireless power transceiving apparatus.

When the first wireless power transceiving apparatus 410 receives power from the second wireless power transceiving apparatus, the at least one magnetostrictive resonator included in the power receiver 430 may be excited by an alternating magnetic field generated by the first wireless power transceiving apparatus 410. The at least one magnetostrictive resonator may have circular remanent magnetization. When the at least one magnetostrictive resonator is excited, the at least one magnetostrictive resonator may vibrate in a torsional vibration mode. The at least one transducing coil may convert vibration generated by excitation of the at least one magnetostrictive resonator, to electric energy. The power receiver 430 may transfer the electric energy converted by the at least one transducing coil to a load terminal (not shown) of the first wireless power transceiving apparatus 410.

In an example, the power transmitter 420 and the power receiver 430 may include at least two magnetostrictive resonators, and at least one transducing coil disposed in a vicinity of the at least two magnetostrictive resonators.

The matching unit 440 matches the first wireless power transceiving apparatus 410 and the second wireless power transceiving apparatus. The matching unit 440 may adjust a magnetic flux of the at least one magnetostrictive resonator included in the power transmitter 420 and the power receiver 430 to match the first wireless power transceiving apparatus 410 and the second wireless power transceiving apparatus. The magnetic flux may be adjusted based on a number of turns of the at least one transducing coil, and/or positions of the at least one magnetostrictive resonator and the at least one transducing coil. Thus, the matching unit 440 may match the first wireless power transceiving apparatus 410 and the second wireless power transceiving apparatus based on the number of turns of the at least one transducing coil, and/or the positions of the at least one magnetostrictive resonator and the at least one transducing coil.

When the first wireless power transceiving apparatus 410 transmits power to the second wireless power transceiving apparatus, the matching unit 440 measures an amount of power transmitted by the power transmitter 420 to the second wireless power transceiving apparatus. The matching unit 440 may match the first wireless power transceiving apparatus 410 and the second wireless power transceiving apparatus, by adjusting the number of turns of the at least one transducing coil included in the power transmitter 420, and/or the positions of the at least one magnetostrictive resonator and the at least one transducing coil included in the power transmitter 420, until the measured amount of power is maximized, e.g., reaches a predetermined maximum value.

When the first wireless power transceiving apparatus 410 receives power from the second wireless power transceiving apparatus, the matching unit 440 measures an amount of power received by the power receiver 430 from the second wireless power transceiving apparatus. The matching unit 440 may match the first wireless power transceiving apparatus 410 and the second wireless power transceiving apparatus, by adjusting the number of turns of the at least one transducing coil included in the power receiver 430, and/or the positions of the at least one magnetostrictive resonator and the at least one transducing coil included in the power receiver 430, until the measured amount of power is maximized, e.g., reaches a predetermined maximum value.

Figure 5A:
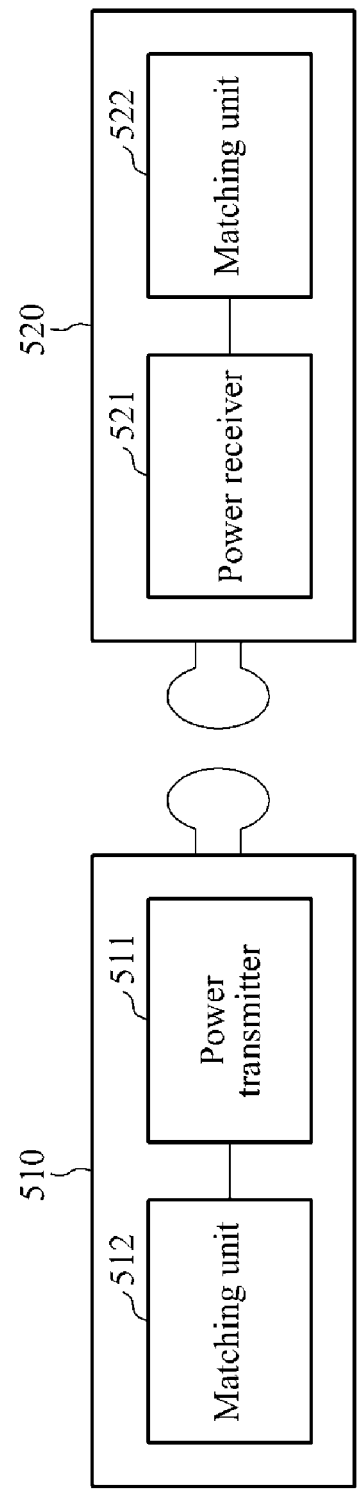
FIGS. 5A and 5B are diagrams illustrating examples of wireless power transmission systems.

FIG. 5A illustrates an example of a wireless power transmission system. Referring to FIG. 5A, a wireless power transmitting apparatus 510 includes a power transmitter 511 and a matching unit 512, and a wireless power receiving apparatus 520 includes a power receiver 521 and a matching unit 522.

Each of the power transmitter 511 and the power receiver 521 may include at least one magnetostrictive resonator, at least one soft magnetic material disposed in a vicinity of the at least one magnetostrictive resonator, and at least one transducing coil disposed in a vicinity of the at least one magnetostrictive resonator or the at least one soft magnetic material. In an example, each of the power transmitter 511 and the power receiver 521 may include at least two magnetostrictive resonators, and at least one transducing coil disposed in a vicinity of the at least two magnetostrictive resonators.

The at least one magnetostrictive resonator included in the power transmitter 511 may be excited by a magnetic field generated by current present in the at least one transducing coil included in the power transmitter 511. The at least one magnetostrictive resonator may have circular remanent magnetization. When the at least one magnetostrictive resonator is excited, the at least one magnetostrictive resonator included in the power transmitter 511 may vibrate in a torsional vibration mode. The at least one transducing coil may convert vibration generated by excitation of the at least one magnetostrictive resonator, to electric energy. The at least one magnetostrictive resonator may transmit the electric energy converted by the at least one transducing coil, through resonance with the at least one magnetostrictive resonator included in the power receiver 521.

The matching unit 512 measures an amount of power transmitted by the power transmitter 511 to the wireless power receiving apparatus 520. The matching unit 512 may match the wireless power transmitting apparatus 510 and the wireless power receiving apparatus 520, by adjusting a number of turns of the at least one transducing coil included in the power transmitter 511, and/or positions of the at least one magnetostrictive resonator and the at least one transducing coil included in the power transmitter 511, until the measured amount of power is maximized, e.g., reaches a predetermined maximum value.

The at least one magnetostrictive resonator included in the power receiver 521 may be excited by an alternating magnetic field generated by the at least one magnetostrictive resonator included in the power transmitter 511. The at least one magnetostrictive resonator included in the power receiver 521 may have circular remanent magnetization. When the at least one magnetostrictive resonator is excited, the at least one magnetostrictive resonator may vibrate in a torsional vibration mode. The at least one transducing coil included in the power receiver 521 may convert vibration generated by excitation of the at least one magnetostrictive resonator, to electric energy. The power receiver 521 may transfer the electric energy converted by the at least one transducing coil, to a load terminal (not shown) of the wireless power receiving apparatus 520.

The matching unit 522 measures an amount of power received by the power receiver 521 from the wireless power transmitting apparatus 510. The matching unit 522 may match the wireless power transmitting apparatus 510 and the wireless power receiving apparatus 520, by adjusting a number of turns of the at least one transducing coil included in the power receiver 521, and/or positions of the at least one magnetostrictive resonator and the at least one transducing coil included in the power receiver 521, until the measured amount of power is maximized, e.g., reaches a predetermined maximum value.

Figure 5B:
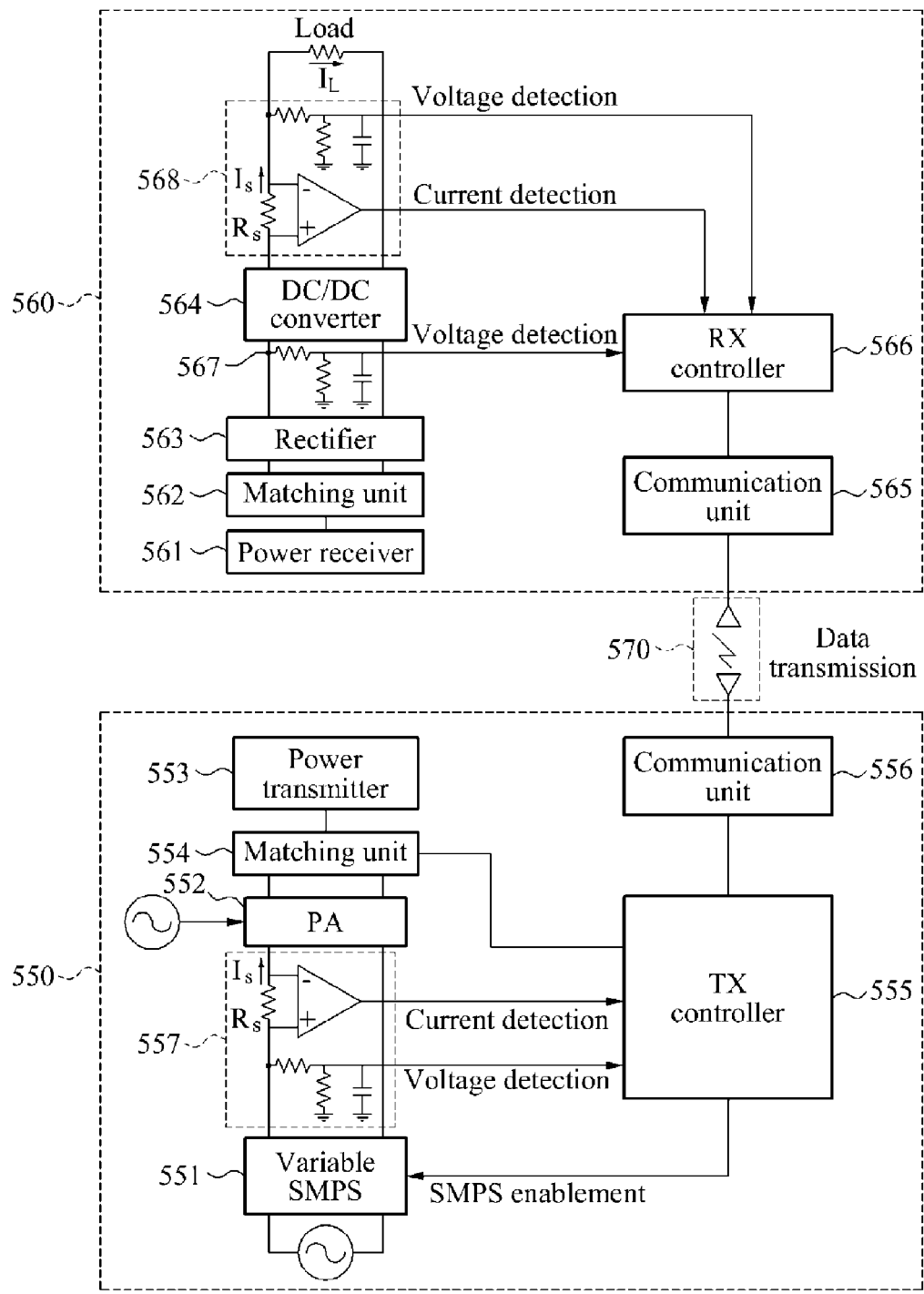

FIG. 5B illustrates another example of a wireless power transmission system. Referring to FIG. 5B, a wireless power transmitting apparatus 550 includes a variable switching mode power supply (SMPS) 551, a power amplifier (PA) 552, a power transmitter 553, a matching unit 554, a transmission (TX) controller 555 (for example, a TX control logic), a communication unit 556, and a power detector 557. A wireless power receiving apparatus 560 includes a power receiver 561, a matching unit 562, a rectifier 563, a DC/DC converter 564, a communication unit 565, a reception (RX) controller 566 (for example, an RX control logic), and a power detector 568.

The variable SMPS 551 generates a DC voltage by switching an alternating current (AC) voltage having a frequency of tens of hertz (Hz) output from a power supply. The variable SMPS 551 may output a DC voltage having a predetermined level, or may output a DC voltage having an adjustable level by the TX controller 555.

The variable SMPS 551 controls supplied voltage based on a level of power output from the PA 552 so that the PA 552 may be operated in a saturation region with high efficiency at all times, and may enable a maximum efficiency to be maintained at all levels of the output power. The PA 552 may have class-E features.

For example, when a common SMPS is used instead of the variable SMPS 551, a variable DC-to-DC (DC/DC) converter needs to be additionally used. In this example, the common SMPS and the variable DC/DC converter may control supplied voltage based on the level of the power output from the PA 552 so that the PA 552 may be operated in the saturation region with high efficiency at all times, and may enable the maximum efficiency to be maintained at all levels of the output power.

The power detector 557 detects an output current and an output voltage of the variable SMPS 551, and provides, to the TX controller 555, information on the detected current and the detected voltage. Additionally, the power detector 557 detects an input current and an input voltage of the PA 552.

The PA 552 generates a power by converting the DC voltage output from the variable SMPS 551 to an AC voltage using a switching pulse signal having a frequency of a few kilohertz (kHz) to tens of megahertz (MHz). In other words, the PA 552 converts a DC voltage supplied to a power amplifier to an AC voltage using a reference resonance frequency $F_{Ref}$, and generates a communication power to be used for communication, or a charging power to be used for charging that may be used in a plurality of target devices. The communication power may be, for example, a low power of 0.1 to 1 milliwatts (mW) that may be used by a target device to perform communication, and the charging power may be, for example, a high power of 1 mW to 200 Watts (W) that may be consumed by a device load of a target device. In this description, the term "charging" may refer to supplying power to an element or a unit that charges a battery or other rechargeable device with power. Also, the term "charging" may refer supplying power to an element or a unit that consumes power. For example, the term "charging power" may refer to power consumed by a target device while operating, or power used to charge a battery of the target device. The unit or the element may include, for example, a battery, a display device, a sound output circuit, a main processor, and various types of sensors.

When a large amount of power corresponding to a few kilowatts (kW) to tens of kW is to be transmitted using a resonant frequency in a band of tens of kilohertz (kHz) to hundreds of kHz, the PA 552 may not be used. Alternatively, power may be transferred to the power transmitter 553 from the variable SMPS 551 or a high-power power source. For example, an inverter may be used instead of the PA 552. The inverter may convert DC power supplied from the high-power power source to AC power. The inverter may convert the power, by converting DC voltage of a predetermined level to AC voltage, using a switching pulse signal in a band of tens of kHz to hundreds of kHz. For example, the inverter may convert the DC voltage of the predetermined level to the AC voltage, using a resonant frequency in a band of tens of kHz to hundreds of kHz of the power transmitter 553.

In this description, the term "reference resonance frequency" refers to a resonance frequency that is nominally used by the wireless power transmitting apparatus 550, and the term "tracking frequency" refers to a resonance frequency used by the wireless power transmitting apparatus 550 that has been adjusted based on a predetermined scheme.

The TX controller 555 may detect a reflected wave of the communication power or a reflected wave of the charging power, and may detect mismatching between the power receiver 561 and the power transmitter 553 based on the detected reflected wave. The TX controller 555 may detect the mismatching by detecting an envelope of the reflected wave, or by detecting an amount of a power of the reflected wave.

The matching unit 554 measures an amount of power transmitted by the power transmitter 553 to the wireless power receiving apparatus 560. The matching unit 554 may match the wireless power transmitting apparatus 550 and the wireless power receiving apparatus 560, by adjusting a number of turns of at least one transducing coil included in the power transmitter 553, and/or positions of at least one magnetostrictive resonator and the at least one transducing coil included in the power transmitter 553, until the measured amount of power is maximized, e.g., reaches a predetermined maximum value.

The TX controller 555 may calculate a voltage standing wave ratio (VSWR) based on a voltage level of the reflected wave and a level of an output voltage of the power transmitter 553 or the PA 552. When the VSWR is greater than a predetermined value, the TX controller 555 detects the mismatching. In this example, the TX controller 555 calculates a power transmission efficiency of each of N predetermined tracking frequencies, determines a tracking frequency $F_{Best}$ having the best power transmission efficiency among the N predetermined tracking frequencies, and changes the reference resonance frequency $F_{Ref}$ to the tracking frequency $F_{Best}$.

Also, the TX controller 555 may control a frequency of the switching pulse signal used by the PA 552. By controlling the switching pulse signal used by the PA 552, the TX controller 555 may generate a modulation signal to be transmitted to the wireless power receiving apparatus 560. In other words, the communication unit 556 may transmit various messages to the wireless power receiving apparatus 560 via in-band communication. Additionally, the TX controller 555 may detect a reflected wave, and may demodulate a signal received from the wireless power receiving apparatus 560 through an envelope of the reflected wave.

The TX controller 555 may generate a modulation signal for in-band communication using various schemes. To generate a modulation signal, the TX controller 555 may turn on or off the switching pulse signal used by the PA 552, or may perform delta-sigma modulation. Additionally, the TX controller 555 may generate a pulse-width modulation (PWM) signal having a predetermined envelope.

The TX controller 555 may determine initial wireless power that is to be transmitted to the wireless power receiving apparatus 560, based on a change in a temperature of the wireless power transmitting apparatus 550, a battery state of the wireless power receiving apparatus 560, a change in an amount of power received at the wireless power receiving apparatus 560, and/or a change in a temperature of the wireless power receiving apparatus 560. The wireless power transmitting apparatus 550 may further include a temperature measurement sensor (not shown) configured to sense a change in temperature. The wireless power transmitting apparatus 550 may receive, from the wireless power receiving apparatus 560, information of the battery state of the wireless power receiving apparatus 560, the change in the amount of power received at the wireless power receiving apparatus 560, and/or the change in the temperature of the wireless power receiving apparatus 560, through communication with the wireless power receiving apparatus 560. The change in the temperature of the wireless power receiving apparatus 560 may be detected based on data received from the wireless power receiving apparatus 560.

The TX controller 555 may adjust voltage supplied to the PA 552 based on the change in the temperature of the wireless power transmitting apparatus 550, using a lookup table. The lookup table may be used to store an amount of the voltage to be adjusted based on the change in the temperature of the wireless power transmitting apparatus 550. For example, when the temperature of the wireless power transmitting apparatus 550 rises, the TX controller 555 may lower the amount of the voltage to be supplied to the PA 552.

The communication unit 556 may perform out-of-band communication using a communication channel. The communication unit 556 may include a communication module, such as a ZigBee module, a Bluetooth module, or any other communication module, that the communication unit 556 may use to perform the out-of-band communication. The communication unit 556 may transmit or receive data 570 to or from the wireless power receiving apparatus 560 via the out-of-band communication.

The power transmitter 553 transfers electromagnetic energy to the power receiver 561. The power transmitter 553 may include at least one magnetostrictive resonator, at least one soft magnetic material disposed in a vicinity of the at least one magnetostrictive resonator, and at least one transducing coil disposed in a vicinity of the at least one magnetostrictive resonator or the at least one soft magnetic material. In an example, the power transmitter 553 may include at least two magnetostrictive resonators, and at least one transducing coil disposed in a vicinity of the at least two magnetostrictive resonators.

In the power transmitter 553, the at least one magnetostrictive resonator and the at least one soft magnetic material may be provided in a form of a rod, and have cylindrical dimensions. In this example, the at least one magnetostrictive resonator may be provided in a form of tubular rod, and include a magnetostrictive ferrite material. The at least one soft magnetic material may be a high-permeability ferrite rod. The at least one magnetostrictive resonator may have equal resonant frequencies. The at least one magnetostrictive resonator and the at least one soft magnetic material may be positioned with a distance less than a length of the at least one magnetostrictive resonator therebetween, and be aligned in a line. In addition, the at least one magnetostrictive resonator and the at least one soft magnetic material may be disposed to be parallel to each other in a two-dimensional array or a three-dimensional array. The at least one transducing coil and the at least one magnetostrictive resonator may be positioned with a distance less than the length of the at least one magnetostrictive resonator therebetween, and the at least one transducing coil and the at least one soft magnetic material may be positioned with a distance less than a length of the at least one soft magnetic material therebetween.

The at least one magnetostrictive resonator included in the power transmitter 553 may be excited by a magnetic field generated by current present in the at least one transducing coil. The at least one magnetostrictive resonator may have circular remanent magnetization. When the at least one magnetostrictive resonator is excited, the at least one magnetostrictive resonator may vibrate in a torsional vibration mode. The at least one transducing coil may convert vibration generated by excitation of the at least one magnetostrictive resonator, to electric energy. The at least one magnetostrictive resonator may transfer the electric energy converted by the at least one transducing coil, through resonance with at least one magnetostrictive resonator included in the power receiver 561.

The power receiver 561 receives electromagnetic energy from the power transmitter 553. Additionally, the power receiver 561 receives the data 570 from the wireless power transmitting apparatus 550, using in-band communication.

The power receiver 561 may include at least one magnetostrictive resonator, at least one soft magnetic material disposed in a vicinity of the at least one magnetostrictive resonator, and at least one transducing coil disposed in a vicinity of the at least one magnetostrictive resonator or the at least one soft magnetic material. In an example, the power receiver 561 may include at least two magnetostrictive resonators, and at least one transducing coil disposed in a vicinity of the at least two magnetostrictive resonators.

The at least one magnetostrictive resonator included in the power receiver 561 may be excited by an alternating magnetic field generated by the power transmitter 553. The at least one magnetostrictive resonator may have circular remanent magnetization. When the at least one magnetostrictive resonator is excited, the at least one magnetostrictive resonator may vibrate in a torsional vibration mode. The at least one transducing coil may convert vibration generated by excitation of the at least one magnetostrictive resonator, to electric energy.

The matching unit 562 measures an amount of power received by the power receiver 561 from the wireless power transmitting apparatus 550. The matching unit 562 matches the wireless power transmitting apparatus 550 and the wireless power receiving apparatus 560. The matching unit 562 may adjust a magnetic flux of the at least one magnetostrictive resonator included in the power receiver 561 to match the wireless power transmitting apparatus 550 and the wireless power receiving apparatus 560. The magnetic flux may be adjusted based on a number of turns of the at least one transducing coil, and/or positions of the at least one magnetostrictive resonator and the at least one transducing coil. Thus, the matching unit 562 may match the wireless power transmitting apparatus 550 and the wireless power receiving apparatus 560, by adjusting the number of turns of the at least one transducing coil included in the power receiver 561, and/or the positions of the at least one magnetostrictive resonator and the at least one transducing coil included in the power receiver 561, until the measured amount of power is maximized, e.g., reaches a predetermined maximum value.

The rectifier 563 generates a DC voltage by rectifying an AC voltage received by the power receiver 561.

The DC/DC converter 564 adjusts a level of the DC voltage output from the rectifier 563 based on a voltage rating of the load. For example, the DC/DC converter 564 may adjust the level of the DC voltage output from the rectifier 563 to a level in a range from 3 volts (V) to 10 V.

The power detector 568 detects a voltage (e.g., $V_{dd}$) of an input terminal 567 of the DC/DC converter 564, and a current and a voltage of an output terminal of the DC/DC converter 564. The power detector 568 outputs the detected voltage of the input terminal 567, and the detected current and the detected voltage of the output terminal, to the RX controller 566. The RX controller 566 uses the detected voltage of the input terminal 567 to compute a transmission efficiency of power received from the wireless power transmitting apparatus 550. Additionally, the RX controller 566 uses the detected current and the detected voltage of the output terminal to compute an amount of power transferred to the load. The TX controller 555 of the wireless power transmitting apparatus 550 determines an amount of power that needs to be transmitted by the wireless power transmitting apparatus 550 based on an amount of power required by the load and the amount of power transferred to the load. When the communication unit 565 transfers an amount of power of the output terminal (e.g., the computed amount of power transferred to the load) to the wireless power transmitting apparatus 550, the TX controller 555 of the wireless power transmitting apparatus 550 may compute the amount of power that needs to be transmitted by the wireless power transmitting apparatus 550.

The communication unit 565 may perform in-band communication for transmitting or receiving data using a resonance frequency by demodulating a received signal obtained by detecting a signal between the power receiver 561 and the rectifier 563, or by detecting an output signal of the rectifier 563. In other words, the RX controller 566 may demodulate a message received via the in-band communication.

Additionally, the RX controller 566 may adjust an impedance of the power receiver 561 to modulate a signal to be transmitted to the wireless power transmitting apparatus 550. For example, the RX controller 566 may increase the impedance of the target resonator so that a reflected wave will be detected by the TX controller 555 of the wireless power transmitting apparatus 550. In this example, depending on whether the reflected wave is detected, the TX controller 555 of the wireless power transmitting apparatus 550 will detect a binary number "0" or "1".

The communication unit 565 may also perform an out-of-band communication using a communication channel. The communication unit 565 may include a communication module, such as a ZigBee module, a Bluetooth module, or any other communication module known in the art, that the communication unit 565 may use to transmit or receive data 570 to or from the wireless power transmitting apparatus 550 via the out-of-band communication.

The various units, modules, and elements, and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

As a non-exhaustive illustration only, a device described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus configured to transceive wireless power, the apparatus comprising:
    a magnetostrictive resonator configured to be excited by a magnetic field;
    a soft magnetic material disposed in a vicinity of the magnetostrictive resonator, and configured to concentrate a magnetic flux of the magnetic field; and
    a transducing coil disposed in a vicinity of the magnetostrictive resonator or the soft magnetic material, and configured to convert mechanical energy generated by the excitation of the magnetostrictive resonator to electric energy.

2. The apparatus of claim 1, wherein the magnetostrictive resonator and the soft magnetic material are in a form of a rod.

3. The apparatus of claim 1, wherein the magnetostrictive resonator and the soft magnetic material are disposed with a distance less than a length of the magnetostrictive resonator therebetween.

4. The apparatus of claim 1, wherein:
    the transducing coil and the magnetostrictive resonator are disposed with a distance less than a length of the magnetostrictive resonator therebetween; and
    the transducing coil and the soft magnetic material are disposed with a distance less than a length of the soft magnetic material therebetween.

5. The apparatus of claim 1, wherein the soft magnetic material is a high-permeability ferrite rod.

6. The apparatus of claim 1, wherein the magnetostrictive resonator and the soft magnetic material are aligned.

7. The apparatus of claim 1, wherein the magnetostrictive resonator is in a form of a tubular rod, and comprises a magnetostrictive ferrite material.

8. The apparatus of claim 1, wherein the magnetostrictive resonator is configured to have circular remanent magnetization, and vibrate in a torsional vibration mode in response to the magnetostrictive resonator being excited by the magnetic field.

9. The apparatus of claim 1, wherein the magnetostrictive resonator and the soft magnetic material are configured to have cylindrical dimensions.

10. The apparatus of claim 1, wherein the magnetostrictive resonator and the soft magnetic material are disposed to be parallel to each other in a two-dimensional or three-dimensional array.

11. The apparatus of claim 1, wherein the magnetostrictive resonator comprises magnetostrictive resonators configured to have equal resonant frequencies.

12. An apparatus configured to transceive wireless power, the apparatus comprising:
    magnetostrictive resonators configured to be excited by a magnetic field; and
    a transducing coil disposed in a vicinity of the magnetostrictive resonators, and configured to convert mechanical energy generated by the excitation of the magnetostrictive resonators to electric energy,
    wherein the magnetostrictive resonators are in a form of a rod.

13. The apparatus of claim 12, wherein the transducing coil and the magnetostrictive resonators are disposed with a distance less than a length of the magnetostrictive resonators therebetween.

14. The apparatus of claim 12, wherein the magnetostrictive resonators are configured to have circular remanent magnetization, and vibrate in a torsional vibration mode in response to the magnetostrictive resonators being excited by the magnetic field.

15. The apparatus of claim 12, wherein the magnetostrictive resonators are aligned with a distance less than a length of the magnetostrictive resonators therebetween.

16. The apparatus of claim 12, wherein the magnetostrictive resonators are disposed to be parallel to each other with a distance less than a length of the magnetostrictive resonators therebetween.

17. The apparatus of claim 12, wherein the magnetostrictive resonators are disposed to be parallel to each other in a two-dimensional or three-dimensional array.

18. The apparatus of claim 12, wherein the magnetostrictive resonators are configured to have equal resonant frequencies.

19. A matching method of a wireless power transmitting apparatus comprising a first magnetostrictive resonator and a transducing coil, the method comprising:
    measuring an amount of power transmitted by the wireless power transmitting apparatus to a wireless power receiving apparatus; and
    adjusting a number of turns of the transducing coil, and/or positions of the transducing coil and the first magnetostrictive resonator, until the measured amount of power is maximized,
    wherein the wireless power transmitting apparatus further comprising a soft magnetic material disposed in a vicinity of the first magnetostrictive resonator or a second magnetostrictive resonator, wherein the first magnetostrictive resonator and the second magnetostrictive resonator are in a form of a rod.

20. A matching method of a wireless power receiving apparatus comprising a first magnetostrictive resonator and a transducing coil, the method comprising:

measuring an amount of power received by the wireless power receiving apparatus from a wireless power transmitting apparatus; and adjusting a number of turns of the transducing coil, and/or positions of the transducing coil and the first magnetostrictive resonator, until the measured amount of power is maximized, wherein the wireless power receiving apparatus further comprising a soft magnetic material disposed in a vicinity of the first magnetostrictive resonator or a second magnetostrictive resonator, wherein the first magnetostrictive resonator and the second magnetostrictive resonator are in a form of a rod.

21. An apparatus comprising:

a power transmitter comprising a first magnetostrictive resonator and a transducing coil, and configured to wirelessly transmit power to another apparatus; and a matching unit configured to measure an amount of the transmitted power, and adjust a number of turns of the transducing coil, and/or positions of the transducing coil and the first magnetostrictive resonator, until the measured amount of the transmitted power is a predetermined maximum value, wherein the power transmitter further comprising a soft magnetic material disposed in a vicinity of the first magnetostrictive resonator or a second magnetostrictive resonator, wherein the first magnetostrictive resonator and the second magnetostrictive resonator are in a form of a rod.

22. The apparatus of claim 21, further comprising:

a power receiver comprising the first magnetostrictive resonator and the transducing coil, and configured to wirelessly receive power from another apparatus; and a matching unit configured to measure an amount of the received power, and adjust the number of turns of the transducing coil, and/or the positions of the transducing coil and the first magnetostrictive resonator, until the measured amount of the received power is a predetermined maximum value.

* * * * *